United States Patent Office 3,046,115

Patented July 24, 1962

3,046,115
LIGHT SENSITIVE MATERIAL FOR PRINTING AND PROCESS FOR MAKING PRINTING PLATES

Maximilian Paul Schmidt and Oskar Süs, Wiesbaden-Biebrich, Germany, assignors, by mesne assignments, to Azoplate Corporation, Murray Hill, N.J., a corporation of New Jersey No Drawing. Filed Dec. 27, 1957, Ser. No. 705,719
Claims priority, application Germany Feb. 2, 1951
34 Claims. (Cl. 96—33)

The present invention relates to the field of photomechanical reproduction, more particularly it pertains to material sensitized by means of water insoluble diazo compounds and to a process of making printing plates from such light-sensitive material.

It is well known that diazo compounds are useful for making light-sensitive material and that certain types of light-sensitive material sensitized by means of diazo compounds are useful for making printing plates. Azo components have previously also been added to light-sensitive diazo layers so that azo dyestuff images would be obtained by an alkaline development performed subsequent to the exposure to light. The use of azo components in the light-sensitive layer for the purpose of bringing about the formation of azo dyestuff images, however, in most cases, renders the development of the images more difficult or frequently reduces the stability of the light-sensitive material.

It has now been found that very advantageous material for making printing forms to be used in the graphic art can be obtained by sensitizing a suitable base with a light sensitive layer of an azo dyestuff insoluble in water, the molecules of which contain at least one residue of an orthoquinone diazide, and in which there is also present at least one auxochromous group in addition to the azo group. By introduction of at least one auxochromous group a considerable intensification of the coloring of the light-sensitive azo dyestuff is achieved. In order to produce the light-sensitive layers the azo dyestuffs to be used according to the present invention are dissolved in an organic solvent, e.g. dioxane or glycolmonomethylether and then the solutions are coated onto a base material in the usual manner, for instance, by means of a plate-whirler. After evaporation of the solvents, smooth deeply colored layers are obtained.

One advantage resulting from the use of these compounds instead of other compounds which have been suggested for the production of printing plates lies in the fact that it is not necessary to add colored or dye-producing substances to the light-sensitive layers in order to obtain an image of high contrast. Such an image is desirable so that the quality of the image can be appraised before inking and correction of the image prior to its use for printing is thus facilitated.

Alkali-soluble resins can be incorporated in the light-sensitive layers. These often help the formation of a continuous flawless layer. They also may help in the development of the images and in the subsequent etching of the base material by means of acids. The diazo compounds can also be used in combination with less colored ortho-diazo anhydrides (orthoquinone diazides) that are insoluble in water. Primarily suitable to serve as base materials are metal sheets, e.g. foils or plates of aluminum, zinc, copper or brass, which can be preconditioned mechanically or chemically in known manner.

In order to obtain images or printing plates from such material, the following procedure is followed: the light-sensitive material is exposed to a light image formed either by contact exposure under a master or by projection. Then, it is treated with an alkaline solution and rinsed with water, and subsequently the image can be linked with greasy ink and/or etched, depending on the requirements.

Under the influence of light the azo dyestuffs mentioned above which constitute diazo compounds and are insoluble in water, change into dyestuff carboxylic acids by splitting up of the benzene nucleus carrying the diazo group. Removal of the dyestuff carboxylic acids without affecting the diazo compounds is accomplished by treatment with an alkaline solution in which the diazo compounds are insoluble or more difficultly soluble than the carboxylic acids. (Compare O. Süs, "Liebig's Annalen der Chemie," volume 556 (1944), page 65). Therefore, by the treatment of the exposed layers with alkaline agents, a positive image is obtained from a positive master. The image has a color in the range from orange to deep violet. This image has excellent visible contrast due to the intensive coloring of the non-decomposed diazo compound. Such images can be used without further treatment for the production of stencils for example, since they change their color only insignificantly, even when exposed to light for some time and even if the diazo group is destroyed by the light. Since the process of exposure to light can generally not be controlled well owing to the heavy coloring of the light-sensitive layers, it is of advantage first to find out the adequate time of exposure for the light-sensitive layer by a gradual exposure under a master or with the aid of a photometer.

Due to the fact that the diazo compound is hydrophobic, the colored diazo image accepts greasy ink very readily. Excellent printing plates are obtained, that are especially well suited (without requiring further processing) for use in planographic and offset printing.

For the production of the water insoluble azo dyestuffs to be used in accordance with this invention, various procedures can be followed:

(*a*) Amino-azo dyestuffs or hydroxy-azo dyestuffs are caused to react with the chlorides of diazonaphthol- or diazophenol-sulfonic acids, or of diazonaphthol- or diazophenol-carboxylic acids, in such manner that at least one hydroxy group or amino group in the residue of the azo dyestuff remains unattacked.

(*b*) The compounds obtained by the condensation of benzoxazolone-sulfochlorides with aromatic nitroamines are reduced. The amino compounds obtained are converted in the customary manner into the respective diazo compounds. Then, the latter are again combined with azo components to form azo dyestuffs. The oxazolone group contained in these dyestuffs can be split with dilute alkalies, whereby o-hydroxyamino compounds with an adhering residue of an azo dyestuff are formed. These compounds can be converted in known manner by diazotization into a diazo-anhydride dyestuff.

(*c*) Products which are obtained by the condensation of polyamino compounds, polyhydroxy compounds, or aminohydroxy compounds, with, for instance, ortho-diazo-naphthol- or ortho-diazo-phenol-sulfochlorides or with the corresponding carboxylic acid chlorides and which contain several diazo-naphthol residues or diazophenol residues, respectively, in their molecules, are coupled with azo components in such manner that at least one quinone diazide residue remains.

(*d*) Ortho-diazo anhydrides which have in their molecule a free hydroxyl group or amino group and in relation to said hydroxyl or amino group, a free coupling position for a hydroxy or amino group, are coupled with a diazo compound to form an azo dyestuff.

The following azo dyes which are referred to in the subsequent complete examples may be used in accordance with this invention.

(1)

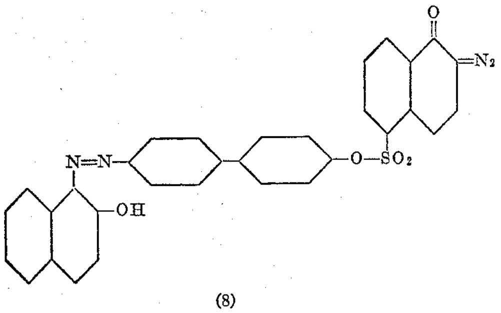

(2)

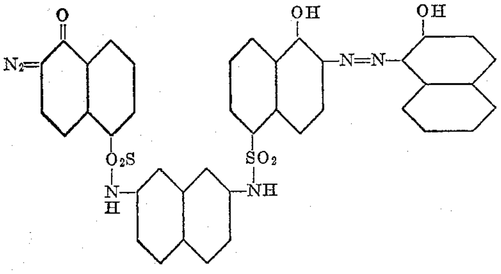

(3)

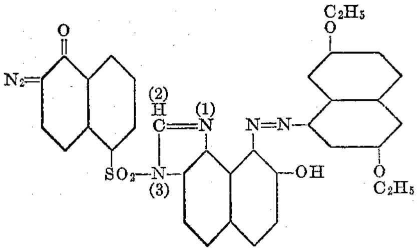

(4)

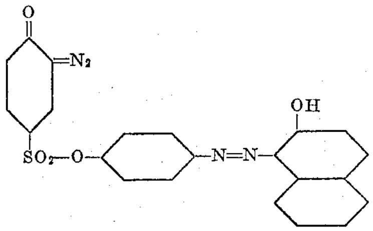

(5)

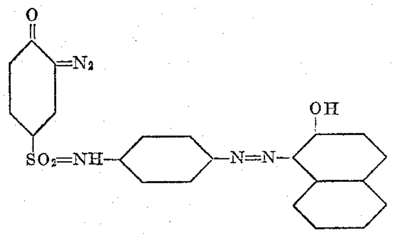

(6)

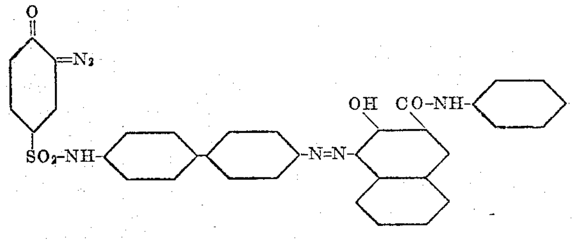

(7)

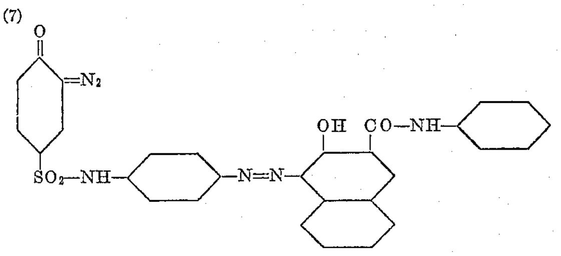

(8)

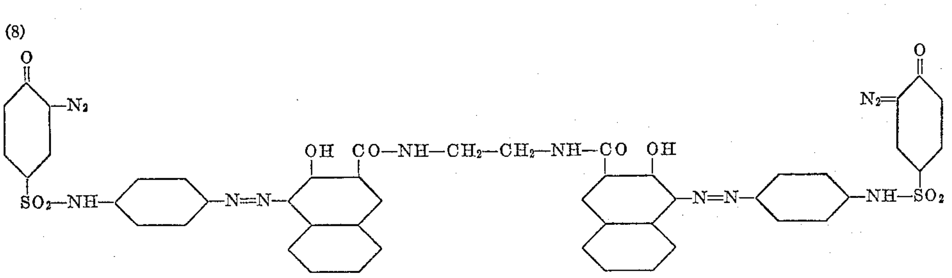

(9)

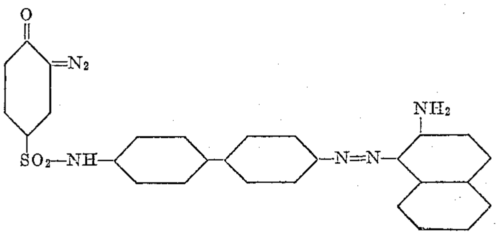

(10)

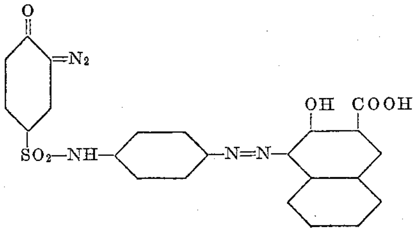

(11)

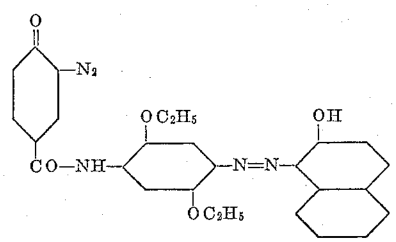

The following examples are inserted to illustrate the present invention. No restriction of the scope of the invention to the contents of the examples is intended.

(1) 1.5 g. of the 2-diazonaphthol-(1)-5-sulfonic acid ester (naphthoquinone-(1,2)-diazide-(2)-5 sulfonic acid ester) of 4′-hydroxy-diphenyl-4-azo-β-naphthol having the Formula 1 above are dissolved in dioxane and the red solution is applied by whirlcoating onto an aluminum foil that has been roughened by brushing or is superficially oxidized. Subsequent to its being dried by means of an electric dryer, a fan, for example, the red layer is exposed to light under a transparent positive, and the image formed is developed with a 5% sodium carbonate solution and washed with water. The scarlet image shows up rich in contrast upon a light background and readily takes greasy ink so that it can be used for printing.

In order to produce the above-mentioned diazo compound, 2 g. of the azo dyestuff derived from diazotized 4-amino-4′-hydroxydiphenyl and β-naphthol are dissolved in 75 cc. of dioxane (diethylene-dioxide), and a solution of 1.6 g. of 2-diazo-naphthol-(1)-5-sulfochloride (naphtho-quinone-(1,2)-diazide-(2)-5-sulfonic acid chloride) in 10 cc. of dioxane is added. To this mixture there are added first 10 cc. of water and then slowly, with simultaneous agitation, 3 cc. of a 10% solution of caustic soda, whereby the yellowish-orange solution reddens. After standing for a short while, the solution is poured into approximately 300 cc. of very dilute hydrochloric acid. The precipitated dyestuff is filtered off, washed neutral with water and dried. The scarlet powder decomposes at a temperature of about 130° C. It is insoluble in dilute solutions of caustic soda. The dyestuff still contains a diazo-anhydride group, since it yields a dark red dyestuff when added to phloroglucinol and caustic soda in the presence of a solvent, e.g. dioxane.

(2) 1.5 gm. of the dyestuff having the Formula 2 above is obtained by the coupling of 1 mole of β-naphthol with 1 mole of the condensation product of 2 moles of 2-diazo-naphthol-(1)-5-sulfochloride and of 1 mole of 2,7-naphthylenediamine are dissolved in 100 cc. of monomethyl-glycolether. This solution is applied in the customary manner to an aluminum foil which has been roughened by brushing or to a smooth brass foil that has been cleaned with pumice powder and with an aqueous solution containing 5% of acetic acid and 5% of potassium alum. Subsequent to the exposure of the layer behind a transparent positive and its development with a 5% soda solution, a dark red image is obtained. The image can be used also for the production of stencils or, for printing, since it accepts greasy ink.

In order to produce the above-mentioned light-sensitive dyestuff 6.2 g. of the condensation product, which is obtained from 2 moles of 2-diazo-naphthol-(1)-5-sulfochloride and 1 mole of 2,7-naphthylenediamine in an inert solvent with the addition of soda solution and 1.2 g. of β-naphthol are dissolved in 100 cc. of dioxane. To this mixture there are then slowly added approximately 30 cc. of a 5% solution of caustic soda. After standing for half an hour the deep blue solution is filtered, then diluted with approximately double the amount of water and acidulated with dilute hydrochloric acid, whereby a dark red dyestuff is precipitated. In order to obtain a better separation of the dyestuff, the mixture is heated for a short while on a steam bath; then the dyestuff is filtered by means of a suction filter and washed with water until a neutral reaction is obtained. After drying at a temperature of 50° C. the dyestuff remains as a dark red powder which is difficult to dissolve in alcohol and benzene, but which can easily be dissolved in dioxane. In the capillary tube it slowly decomposes at temperatures above 215° C. If the light-sensitive dyestuff is dissolved in dioxane and if a copper sulfate solution is added to the red solution a violet dyestuff for lake-making is obtained that contains copper. The latter dyestuff is precipitated by means of water. It may be coated to form light-sensitive layers in the same manner as the original dyestuff.

(3) 1 to 2 g. of the light-sensitive azo dyestuff probably of Formula 3 derived from 1 mole of diazotized amino-hydroquinone-diethyl-ether and from 1 mole of 7′-hydroxy-naphtho-1′,2′:4,5-imidazole which has been substituted at the nitrogen of the imidazole nucleus by a residue of 2-diazo-naphthol-(1)-5-sulfonyl together with 30–50% of colophony computed with respect to the light-sensitive dyestuff, are dissolved in 100 cc. of dioxane and the red solution is applied as a layer to a metal plate, e.g. an aluminum foil. Subsequent to the exposure to light under a master and the development with a 3% solution of trisodium phosphate or soda, a red image is obtained which can be used as described above.

The light-sensitive azo dyestuff is produced in the following manner: 2/100 mole=3.68 g. of 7′-hydroxy-naphtho-1′,2′:4,5-imidazole and 1/100 mole=2.68 g. of 2-diazonaphthol-(1)-5-sulfochloride are dissolved in 300 cc. of dioxane and the solution is heated for approximately 10 minutes on a steam bath. After the solution has stood over night, the separated crystals which represent the hydrochloride of 7′-hydroxy-naphtho-1′,2′:4,5-imidazole are filtered off and the solution is poured into dilute hydrochloric acid (100 cc. of water per 1.5 cc. of concentrated hydrochloric acid), whereby there precipitates 7′-hydroxy-naphtho-1′,2′:4,5-imidazole substituted at the nitrogen by the 2-diazo-naphthol-(1)-5-sulfonyl residue. It is insoluble in dilute hydrochloric acid, however it can be dissolved in a dilute solution of caustic soda. After recrystallization from alcohol, the product takes on a darker color when heated to a temperature exceeding 250° C. and then chars slowly. It is a dark red powder which can be dissolved in alcohol and water, but which cannot be dissolved in ligroin. It slowly decomposes at temperatures from 180–250° C.

In order to bring about the formation of the light-sensitive dyestuff, the product may be dissolved in a solvent, e.g. in monomethyl-glycol ether and coupled in the customary manner (subsequent to the addition of soda solution) with a diazo compound derived from amino-hydroquinone-diethyl-ether. A red dyestuff precipitates, the precipitation of which can be completed by the addition of some water. Subsequent to filtering, washing with water and drying, the dyestuff can be used for the production of light-sensitive layers.

A similar light-sensitive dyestuff is obtained if the dyestuff 8′-phenyl-azo-7′-hydroxynaphtho-1′,2′:4,5-imidazol which is obtained by coupling diazotized aniline with 7′-hydroxy-naphtho-1′,2′:4,5-imidazol in an alkaline solution, is caused to react in dioxane with 2-diazo-naphthol-(1)-5-sulfochloride at 50° C. with addition of soda solution. The scarlet light-sensitive dyestuff cannot be dissolved in water and soda solution, it may, however, be dissolved in alcohol and benzene, giving an orange-red color. After recrystallization from methanol it decomposes at temperatures of over 200° C. It can be used for light-sensitive layers in the same manner.

(4) 0.2 g. of the light-sensitive azo dyestuff with the Formula No. 4 are dissolved in 10 cc. of glycol-monomethyl ether and the solution is applied by whirl coating to an aluminum foil the surface of which has been mechanically roughened. Having been thoroughly dried by means of an electric dryer, the layer is exposed for five minutes under a transparent master to an arc lamp (18 amperes, 150 volts, distance 70 cm.), and the image is developed with a 2% solution of trisodium-phosphate. A positive image, having an intense orange color, is obtained from a positive master. If the image is to be used for printing, it must be treated with a 1% solution of phosphoric acid prior to its being inked with greasy ink.

The light-senstive azo dyestuff specified above is prepared in the following manner:

5.3 g. of 1-(p-hydroxy-phenyl-azo)-2-hydroxy-naphthalene are dissolved in 30 cc. of dioxane, and to this solution there is added a solution of 4.6 g. of benzoquinone-(1,2)-diazide-(2) - 4 - sulfochloride (obtained by the action of chlorosulfonic acid on 2-diazo-1-phenol-4-sulforic acid at about 60° C.) in 40 cc. of dioxane. While this mixture is being stirred, 58 cc. of a n/2-solution of caustic soda is added thereto. The pH-value of the solution should then approximate 8. The condensation product gradually separates in the form of a red-brown oil. By the addition of water to the reaction mixture, the precipitation is completed and after stirring for several hours the light-sensitive azo dyestuff obtained solidifies in a crystalline state and can be filtered off. The red-brown-colored compound is washed with water and dried on clay (the yield amounts to 5.5 g. Decomposition sets in when the compound is heated in a capillary tube beyond 170° C.).

(5) 0.2 g. of the light-sensitive dyestuff corresponding to the Formula 5 and 0.1 g. of a formaldehyde-phenol-resin-novolak which is sold by the firm "Chemische Werke Albert," Wiesbaden-Biebrich, are dissolved in 10 cc. of glycol-monomethyl-ether and this solution is applied, as described in Example 4, as a layer to an aluminum foil. From the sensitized foil there is obtained by exposure to light under a master for six minutes a positive deeply colored red-orange image which becomes visible subsequent to development by means of a 1% solution of trisodium-phosphate. By a brief after treatment with a 1% solution of phosphoric acid, a printing plate is obtained that can be used for printing immediately.

The above mentioned azo dystuff is produced in the following manner:

50 g. of benzoxazolone-5-sulfochloride, obtained from benzoxazolone - 5 - sulfonic acid (compare Friedländer "Fortschritte der Teerfarbenfabrikation," volume VIII (1905/07), page 1359) by heating the latter with phosphorus-pentachloride for several hours at 120° C., are dissolved in 500 cc. of dioxane and to this solution there is added a solution of 28 g. of 4-nitro-analine in 140 cc. of dioxane. The condensation product that separates in the form of a yellow-colored oil after the solution has been heated for several hours is dissolved in the cold together with the remainder of the dioxane solution in a normal solution of caustic soda and is reprecipitated from the alkaline solution, subsequent to the latter's filtration with animal charcoal, by the dropwise addition of 16% hydrochloric acid while the solution is stirred and cooled with ice. The resultant benzoxazolone-5-(N-p-nitrophenyl)-sulfonamide is obtained in the form of a yellow-colored crystalline precipitate with a yield amounting to 41.5 g. The compound melts at approximately 290° C. under decomposition.

36 g. of finely powdered benzoxazolone-5-(N-p-nitrophenyl)-sulfonamide are catalytically reduced, with 50 g. of a nickel catalyst (nickel contact produced according to Raney) in alcoholic suspension, in an autoclave at room temperature. The amino compound obtained (34.5 g.) forms white crystals and melts at a temperature of 207° to 208° C. under decomposition.

13.6 g. of benzoxazolone-5-(N-p-amino-phenyl)-sulfonamide (hydrochloride) are diazotized with a sodium-nitrite solution in dilute hydrochloric acid. The weakly yellow colored solution of the diazo compound after filtration with charcoal is poured dropwise into a solution of 4.32 g. of β-naphthol in 50 cc. of a normal solution of caustic soda at a temperature of 10° to 20° C. During the addition of the diazo compound, the β-naphthol solution is stirred and the alkaline reaction is maintained. A deeply blue-red colored solution forms during this procedure. The azo dyestuff is obtained therefrom by adding 16% hydrochloric acid. The dyestuff is in the form of a deeply red-colored voluminous precipitate and is filtered off after a brief heating of the suspension on a steam bath (yield 13.7 g.).

In order to produce the above mentioned light-sensitive azo dyestuff, illustrated by Formula 5, the azo dyestuff described in the preceding paragraph is heated with a solution of caustic soda on a steam bath, and sodium nitrite and hydrochloric acid are added to the saponification product. The light-sensitive azo dyestuff, a deeply red-colored substance, melts under decomposition at a temperature of 260° C. (yield 14.7 g.).

(6) 0.2 g. of the light-sensitive azo dyestuff with the Formula 6 are dissolved in 10 cc. of glycol-monomethyl ether and the solution is applied by whirlcoating to an anodically oxidized aluminum foil. Having been thoroughly dried, the plate is exposed to light under a master for three minutes and is then developed with a 1% solution of trisodium phosphate. When used as a printing plate, the brownish-red colored image may be wiped with a 1% solution of phosphoric acid and inked with greasy ink. From a positive master there is obtained a positive image with great stability in the presence of acids.

The above mentioned light-sensitive azo dyestuff is obtained in the following manner:

To a warm solution of 18.4 g. of 4,4'-diamino-diphenyl in dioxane there is added a solution of 24 g. of benzoxazolone-5-sulfochloride in dioxane, and the mixture is left standing for several hours. The white voluminous precipitate is triturated together with the remainder of the evaporation of the dioxane mother liquor with a n/2-solution of caustic soda and is then filtered. From the filtrate there is precipitated, by the addition of hydrochloric acid with constant stirring and cooling, the hydrochloride of N-(benzoxazolone-5-sulfonyl) - 4',4'' - diamino-diphenyl in the form of a white pulverulent mass (yield 35 g.).

The above described amino-hydrochloride dissolved in dioxane is diazotized by means of hydrochloric acid and sodium nitrite and this diazo solution is added to a solution of 6.5 g. of 2,3-hydroxy-naphthoic-acid-anilide in a n/2-solution of caustic soda. The reaction mixture is stirred until no 2,3-hydroxy-naphthoic-acid-anilide is traceable. A deeply blue-red colored azo dyestuff (yield 15 g.) is formed.

From this azo dyestuff there is obtained, by splitting the oxazolone ring and by diazotization as in Example 5, a brown-red colored dyestuff, that chars without melting when heated to a temperature of more than 300° C. This is the light-sensitive azo dyestuff described above.

(7) A glycol-monomethyl-ether solution, containing 2% of the light-sensitive azo dyestuff corresponding to the formula specified in the general description under 7 and 1% of the formaldehyde-phenol-resin-novolak mentioned in Example 5, is applied to an aluminum foil the surface of which has been mechanically roughened and is thoroughly dried to form a light-sensitive layer. After it has been exposed to light under a master, the layer is developed by being briefly tamponed with an 0.8% trisodium phosphate solution and yields an intensively red-violet colored positive image. For the purpose of being used as a printing plate, the image is inked, after wiping with a 1% solution of phosphoric acid.

The above mentioned light-sensitive azo dyestuff is produced from the benzoxazolone-5-(N-p-amino-phenyl)-sulfonamidehydrochloride described in Example 5 and from 2,3-hydroxy-naphthoic-acid-anilide by proceeding analogously to the procedure specified in Example 5. The splitting of the oxazolone ring and the diazotization of the hydroxy-amino compound may be effected also in accordance with Example 5. The light-sensitive azo dyestuff obtained is colored deeply brown-red and chars slowly when heated to more than 300° C. without melting.

(8) To an aluminum foil with a mechanically roughened surface there is applied in the customary manner a solution of 0.2 g. of the light-sensitive azo dyestuff corresponding to the Formula 8 and of 0.1 g. of the formaldehyde-phenol-resin-novolak mentioned in Example 5 in 10 cc. of glycolmonomethyl-ether, which is then dried. After an exposure to light for six minutes under a positive master and by careful development with a 0.5% solution of trisodium-phosphate, there is obtained a deeply red-violet colored positive image which can be treated for the purpose of being used as a printing plate with a 1% solution of phosphoric acid and which can be inked with greasy ink in one of the customary printing machines.

The light-sensitive azo dyestuff is produced from benzoxazolone - 5 -(N - p - amino - phenyl) - sulfonamide and from N,N'-bis-(2.3-hydroxy-naphthoyl)-ethylene-diamide by proceeding analogously to the working procedure described in Example 5. It is to be regarded as a bis-diazo-bis-azo dyestuff and constitutes a deeply blue-red colored powder, that chars when heated to more than 300° C. without melting.

(9) A 2% solution of the light-sensitive azo dyestuff corresponding to the Formula No. 9 in a mixture of equal parts of glycolmonomethyl-ether and of methyl-ethyl-ketone is applied as a layer to a nonpreconditioned aluminum foil. The deeply orange-colored image, obtained from the coated foil by its exposure to light under a master and its subsequent development with a 1% solution of trisodium phosphate, can be used as a master in the production of stencils. Instead of on aluminum foil a zinc plate can also be used to serve as the base material. Trisodium phosphate is essential for the development of the image.

In order to produce the light-sensitive azo dyestuff, benzoxazolone-5-sulfochloride is unilaterally condensed with benzidine, analogously to the method described in Example 5. Subsequent to the splitting of the oxazolone ring (compare Example 5), the hydroxy-diamino compound is converted by diazotization into the tetrazo compound, and the latter is coupled with 1 mole of β-naphthylamine in an acetic acid solution. When the acetic acid solution is diluted with water, the dyestuff is precipitated in the form of a dark red powder. On heating in a capillary tube, the dyestuff begins to darken at a temperature of 200° C. Decomposition takes place at 240° C. The dyestuff is readily soluble in organic solvents.

(10) A 1% solution of the light-sensitive azo dyestuff with the Formula 10 in glycolmonomethylether is coated onto a superficially roughened aluminum foil. After thorough drying of the coated side an image is produced on the sensitized material by exposing it behind a design produced on transparent paper. The exposed side of the foil is treated with a 1% solution of disodium phosphate or a 1% solution of sodium bicarbonate and a deeply red violet colored image of the design appears on a blank metallic background. The side of the foil on which the image is to be seen is briefly wiped over with 1% phosphoric acid and the thus obtained material is excellently suited for the production of stencils.

The azo dyestuff used with the Formula 10 is produced analogously to the azo dyestuff described in Example 5 corresponding to Formula 5. The benzoxazolone-5-[N-p-amino-phenyl]-sulfonamide is coupled in alkaline solution with 2-hydroxy-3-naphthoic acid after diazotization. After splitting up the oxazolone nucleus by heating with dilute sodium hydroxide solution the hydroxy-amino compound which formed is diazotized. The azo dyestuff carboxylic acid with the Formula 10 is a deeply brown-red powder and it can be dissolved in a solution of sodium bicarbonate giving a solution of red-violet color. When heated in the capillary tube charring takes place starting at about 150° C. and gradually increasing with increasing temperature.

(11) 0.2 g. of the light-sensitive azo dyestuff with the Formula 11 are dissolved in 20 cc. of glycolmonomethylether and with this solution an aluminum foil is coated in the customary manner. By exposing the sensitized foil behind a positive transparent master an image of the master is produced that is developed with a 1% solution of trisodium phosphate. A violet colored positive image is obtained which, after being wiped with an aqueous solution containing 8% of dextrine, 1% phosphoric acid and 1% formaldehyde can be dyed with greasy ink. Prints can be obtained from the image immediately.

The azo dyestuff with Formula 11 is prepared by condensing in toluene in the presence of phosphorus trichloride equimolecular quantities of o-hydroxybenzoic acid and amino hydroquinone diethyl ether. N-(p-hydroxy benzene)aminohydroquinone diethyl ether is the condensation product. This carbonamide has a melting point of 165 to 167° C. after recrystallization from benzene. By nitrification with nitric acid in glacial acetic acid the N'-(3-nitro-4-hydroxybenzoyl)-4'-nitro-2',5'-diethoxy-aniline (melting point 191–198° C.) is obtained (from glacial acetic acid). By catalytic reduction of the nitro compound with a "Raney"-nickel contact in alcohol N'-(3-amino-4-hydroxy-benzoyl)-4'-amino-2',5'-diethoxyaniline (melting point 212° C.) is obtained. 1 mol of this diamino compound is partially diazotized in hydrochloric acid solution with 0.9 mol of sodium nitrite and after this solution has been brought to a pH=6, it is coupled to the azo dyestuff with 0.9 mol of β-naphthol dissolved in the computed quantity of highly dilute sodium hydroxide. After acidification with hydrochloric acid the azo dyestuff comes down as a finely crystalline red-brown precipitate. In order to diazotize the dyestuff again it is dissolved in highly dilute sodium hydroxide after washing with water and the solution is acidified with hydrochloric acid after addition of the computed quantity of sodium nitrite. The azo dyestuff with the Formula 11 forms a brown-red powder and chars slowly when heated in a tube without showing a sharp melting point.

This application is a division of applications Serial Nos. 472,224, 517,086 and 524,622, filed November 30, 1954, June 21, 1955, and July 26, 1955, respectively, which are all continuations-in-part of application Serial No. 268,352, filed January 25, 1952, and now abandoned.

What is claimed is:

1. A compound having the formula

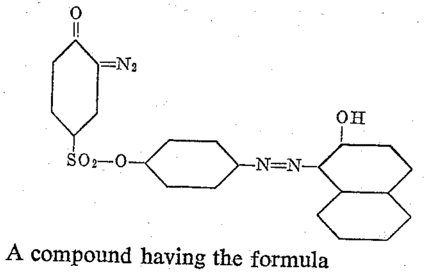

2. A compound having the formula

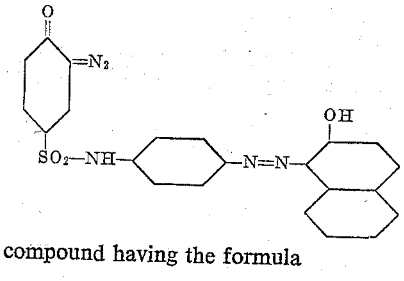

3. A compound having the formula

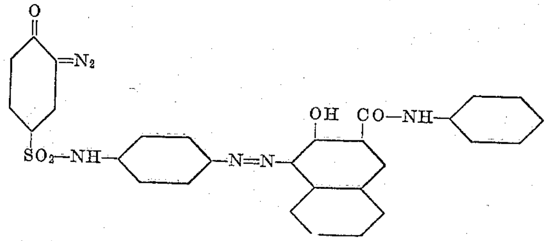

4. A presensitized printing plate comprising a metal base having a coating thereon of a compound of the formula

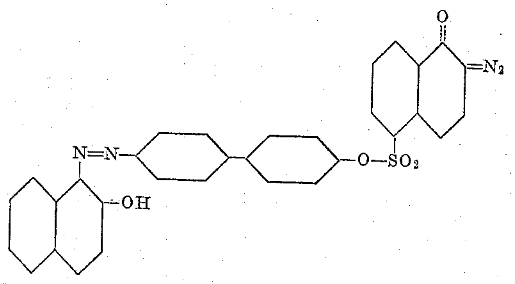

5. A presensitized printing plate comprising a metal base having a coating thereon of a compound of the formula

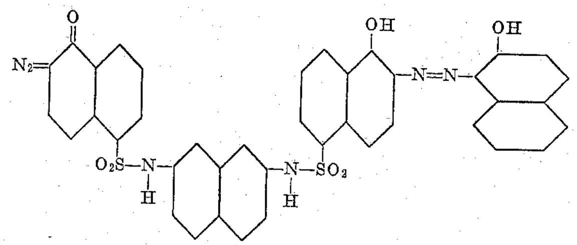

6. A presensitized printing plate comprising a metal base having a coating thereon of a compound of the formula

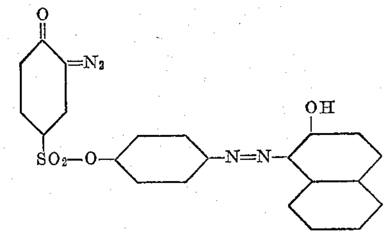

7. A presensitized printing plate comprising a metal base having a coating thereon of a compound of the formula

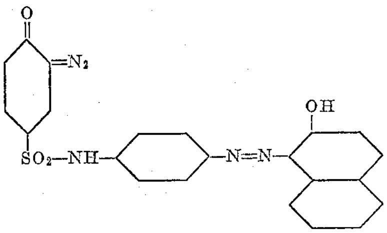

8. A presensitized printing plate comprising a metal base having a coating thereon of a compound of the formula

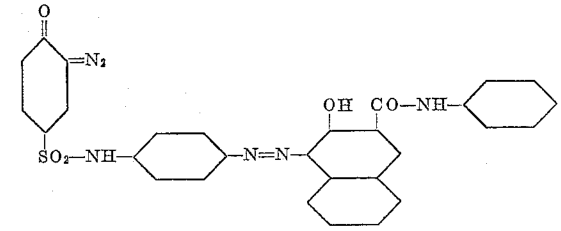

9. A process for developing a printing plate which comprises exposing to light under a master a metal base having a compound thereon of the formula

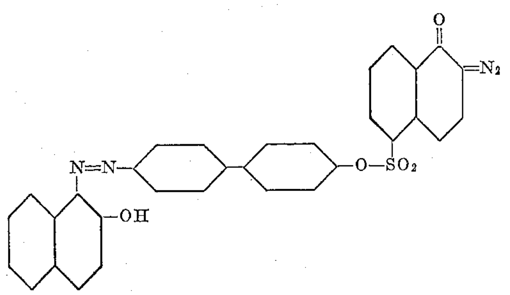

to thereby form a decomposition product in the light struck areas and removing the decomposition product by treatment with a weakly alkaline solution.

10. A process for developing a printing plate which comprises exposing to light under a master a metal base having a compound thereon of the formula

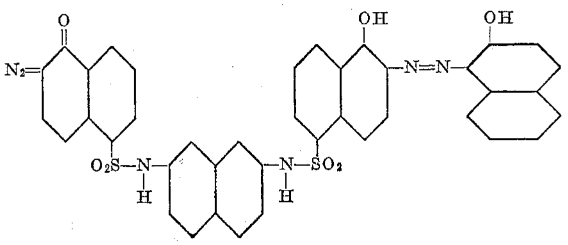

to thereby form a decomposition product in the light struck areas and removing the decomposition product by treatment with a weakly alkaline solution.

11. A process for developing a printing plate which comprises exposing to light under a master a metal base having a compound thereon of the formula

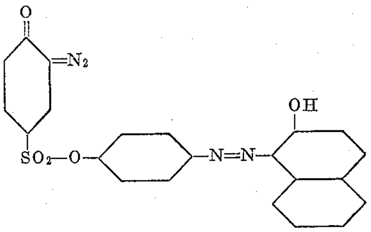

to thereby form a decomposition product in the light struck areas and removing the decomposition product by treatment with a weakly alkaline solution.

12. A process for developing a printing plate which comprises exposing to light under a master a metal base having a compound thereon of the formula

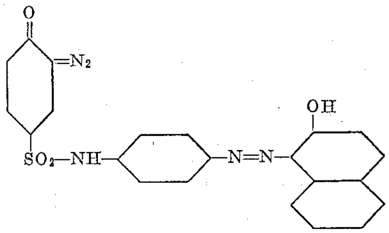

to thereby form a decomposition product in the light struck areas and removing the decomposition product by treatment with a weakly alkaline solution.

13. A process for developing a printing plate which comprises exposing to light under a master a metal base having a compound thereon of the formula

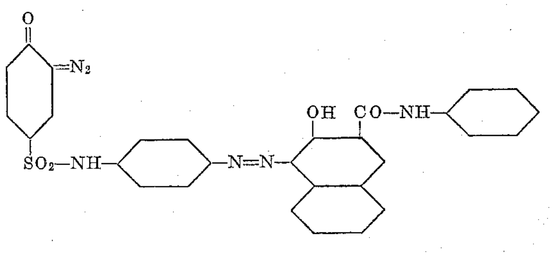

to thereby form a decomposition product in the light struck areas and removing the decomposition product by treatment with a weakly alkaline solution.

14. A compound having the formula

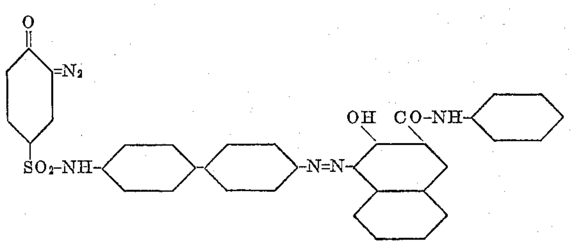

15. A compound having the formula

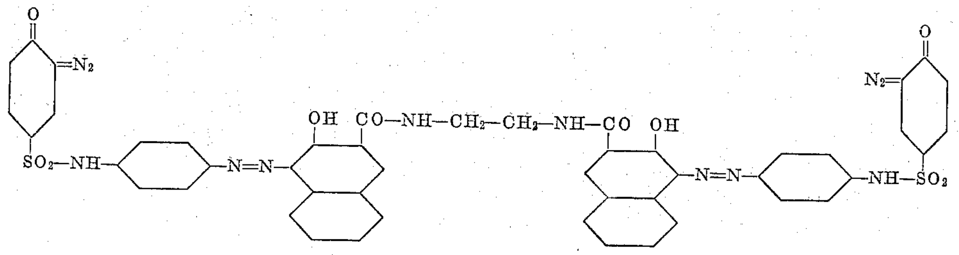

16. A compound having the formula

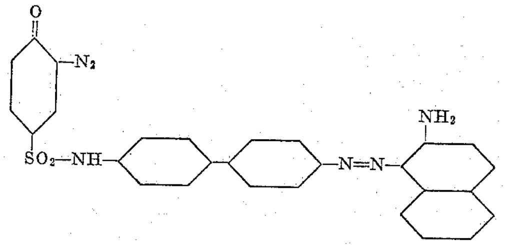

17. A compound having the formula

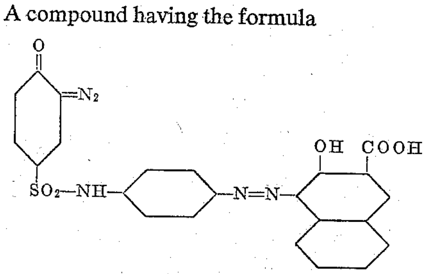

18. A compound having the formula

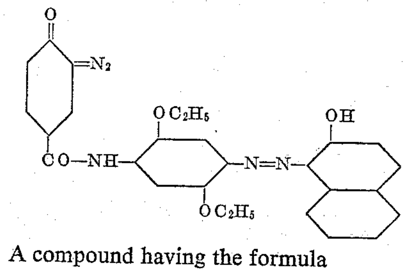

19. A compound having the formula $$D—A—B—R—N{=}N—R_1$$

in which D is an ortho-benzoquinone diazide group, A is selected from the group consisting of $—SO_2—$ and —CO— groups, B is selected from the group consisting —O— and —NX— groups wherein X is selected from the group consisting of hydrogen and groups which taken together with R form an imidazole ring, R is an arylene group and $R_1$ is an aryl group.

20. A compound having the formula

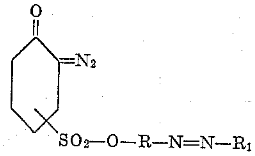

in which R is an arylene group and $R_1$ is an aryl group.

21. A compound having the formula

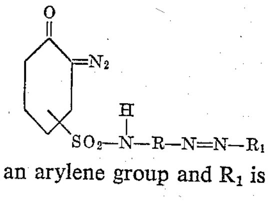

in which R is an arylene group and $R_1$ is an aryl group.

22. A compound having the formula

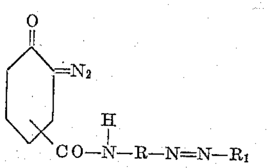

in which R is an arylene group and $R_1$ is an aryl group.

23. A presensitized printing plate comprising a metal base having a coating thereon of a compound of the formula $$D—A—B—R—N{=}N—R_1$$

in which D is an ortho-quinone diazide group, A is selected from the group consisting of $—SO_2—$ and —CO— groups, B is selected from the group consisting of —O— and —NX— groups wherein X is selected from the group consisting of hydrogen and groups which taken together with R form an imidazole ring, R is an arylene group and $R_1$ is an aryl group.

24. A presensitized printing plate comprising a metal base having a coating thereon of a compound of the formula

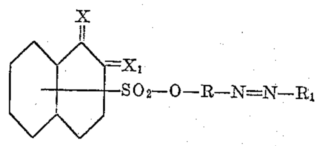

in which X and $X_1$ are selected from the group consisting of $N_2$ and O and are different, R is an arylene group and $R_1$ is an aryl group.

25. A presensitized printing plate comprising a metal base having a coating thereon of a compound of the formula

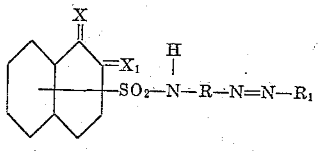

in which X and $X_1$ are selected from the group consisting of $N_2$ and O and are different, R is an arylene group and $R_1$ is an aryl group.

26. A presensitized printing plate comprising a metal base having a coating thereon of a compound of the formula

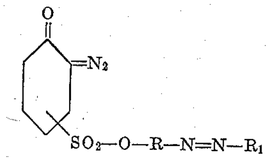

in which R is an arylene group and $R_1$ is an aryl group.

27. A presensitized printing plate comprising a metal base having a coating thereon of a compound of the formula

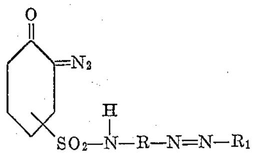

in which R is an arylene group and $R_1$ is an aryl group.

28. A presensitized printing plate comprising a metal base having a coating thereon of a compound of the formula

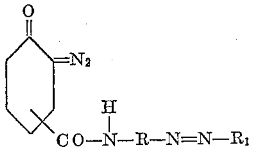

in which R is an arylene group and $R_1$ is an aryl group.

29. A process for developing a printing plate which comprises exposing to light under a master a metal base having a compound thereon of the formula $$D—A—B—R—N{=}N—R_1$$

in which D is an ortho-quinone diazide group, A is selected from the group consisting of $—SO_2—$ and —CO— groups, B is selected from the group consisting of —O— and —NX— groups wherein X is selected from the group consisting of hydrogen and groups which taken together with R form an imidazole ring, R is an arylene group and $R_1$ is an aryl group, to thereby form a decomposition product in the light struck areas and removing the decomposition product by treatment with a weakly alkaline solution.

30. A process for developing a printing plate which comprises exposing to light under a master a metal base having a compound thereon of the formula

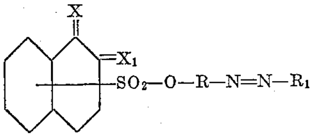

in which X and $X_1$ are selected from the group consisting of $N_2$ and O and are different, R is an arylene group and $R_1$ is an aryl group, to thereby form a decomposition product in the light struck areas and removing the decomposition product by treatment with a weakly alkaline solution.

31. A process for developing a printing plate which comprises exposing to light under a master a metal base having a compound thereon of the formula

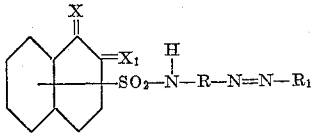

in which X and $X_1$ are selected from the group consisting of $N_2$ and O and are different, R is an arylene group and $R_1$ is an aryl group, to thereby form a decomposition product in the light struck areas and removing the decomposition product by treatment with a weakly alkaline solution.

32. A process for developing a printing plate which comprises exposing to light under a master a metal base having a compound thereon of the formula

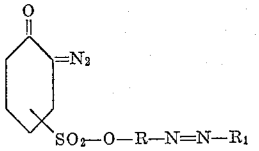

in which R is an arylene group and $R_1$ is an aryl group, to thereby form a decomposition product in the light struck areas and removing the decomposition product by treatment with a weakly alkaline solution.

33. A process for developing a printing plate which comprises exposing to light under a master a metal base having a compound thereon of the formula

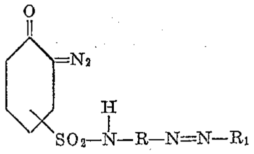

in which R is an arylene group and $R_1$ is an aryl group, to thereby form a decomposition product in the light struck areas and removing the decomposition product by treatment with a weakly alkaline solution.

34. A process for developing a printing plate which comprises exposing to light under a master a metal base having a compound thereon of the formula

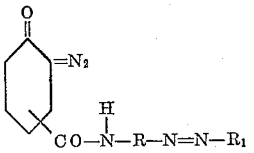

in which R is an arylene group and $R_1$ is an aryl group, to thereby form a decomposition product in the light struck areas and removing the decomposition product by treatment with a weakly alkaline solution.

References Cited in the file of this patent

FOREIGN PATENTS

| | | |
|---|---|---|
| 506,016 | Belgium | Jan. 15, 1952 |
| 508,664 | Belgium | Feb. 15, 1952 |
| 872,154 | Germany | Mar. 30, 1953 |